(12) United States Patent
Hashimoto et al.

(10) Patent No.: US 7,533,592 B2
(45) Date of Patent: May 19, 2009

(54) SLEEVE SPLINE STRUCTURE OF SYNCHRONIZER

(75) Inventors: Manabu Hashimoto, Toyota (JP); Shinji Ogawa, Toyota (JP); Koji Naito, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 318 days.

(21) Appl. No.: 11/444,485

(22) Filed: Jun. 1, 2006

(65) Prior Publication Data

US 2006/0272437 A1  Dec. 7, 2006

(30) Foreign Application Priority Data

Jun. 2, 2005  (JP) .............................. 2005-162675

(51) Int. Cl.
*F16H 3/38* (2006.01)
*F16D 11/06* (2006.01)
(52) U.S. Cl. .................................... 74/339; 192/53.34
(58) Field of Classification Search .................. 74/339; 192/108, 53.34, 69.9; 403/359.1–359.2, 403/359.6
See application file for complete search history.

(56) References Cited

U.S. PATENT DOCUMENTS

| 2,736,411 | A | * | 2/1956 | Schmid | 192/53.3 |
|---|---|---|---|---|---|
| 4,712,662 | A | * | 12/1987 | Elverdam | 192/53.341 |
| 4,905,806 | A | * | 3/1990 | Hillenbrand et al. | 192/53.343 |
| 6,244,413 | B1 | * | 6/2001 | Gutmann et al. | 192/108 |
| 6,467,598 | B2 | * | 10/2002 | Jackson et al. | 192/53.34 |
| 2005/0199466 | A1 | * | 9/2005 | Miyamoto et al. | 192/53.1 |

FOREIGN PATENT DOCUMENTS

| DE | 196 46 850 C1 | 11/1997 |
|---|---|---|
| DE | 196 26 194 A1 | 1/1998 |
| DE | 101 13 948 A1 | 9/2002 |
| FR | 1 225 049 | 6/1960 |
| JP | 7-190092 | 7/1995 |
| JP | 8-42596 | 2/1996 |
| JP | 2005-291490 | 10/2005 |

\* cited by examiner

*Primary Examiner*—Roger Pang
(74) *Attorney, Agent, or Firm*—Oblon, Spivak, McClelland, Maier & Neustadt, P.C.

(57) ABSTRACT

A sleeve spline structure of a synchronizer capable of lowering contact pressure in synchronization action is provided. The sleeve spline structure of a synchronizer has a first tooth portion for synchronization in acceleration, a second tooth portion for synchronization in deceleration, and a third tooth portion in a shape readily inserted between tooth portions of a gear piece.

11 Claims, 5 Drawing Sheets

SLEEVE SPLINE STRUCTURE OF SYNCHRONIZER

This nonprovisional application is based on Japanese Patent Application No. 2005-162675 filed with the Japan Patent Office on Jun. 2, 2005, the entire contents of which are hereby incorporated by reference.

BACKGROUND OF THE INVENTION

1. Field of the Invention

The present invention relates to a sleeve spline structure of a synchronizer, and more particularly to a sleeve spline structure of a synchronizer used in a manual transmission.

2. Description of the Background Art

A sleeve spline structure of a synchronizer has conventionally been disclosed, for example, in Japanese Patent Laying-Open No. 8-042596.

SUMMARY OF THE INVENTION

Japanese Patent Laying-Open No. 8-042596 discloses a structure including a tooth dedicated for synchronization that has a large chamfer angle and a tooth dedicated for push-through into gear piece that has a small chamfer angle.

According to the conventional art, however, when a thickness of a spline tooth is made smaller in order to ensure a length of engagement, spline chamfer contact area is also made smaller and a contact pressure in synchronization action becomes high.

The present invention was made to solve the above-described problems, and an object of the present invention is to provide a sleeve spline structure of a synchronizer capable of lowering contact pressure in synchronization action.

A sleeve spline structure of a synchronizer according to the present invention is provided in a hub sleeve of the synchronizer in which a synchronizer ring is interposed between the hub sleeve and a gear piece. The sleeve spline structure includes a first tooth portion for synchronization in shifting up, a second tooth portion for synchronization in shifting down, and a third tooth portion in a shape readily inserted between tooth portions of the gear piece.

In the sleeve spline structure of a synchronizer structured as above, the first tooth portion for synchronization in shifting up, the second tooth portion for synchronization in shifting down, and the third tooth portion readily inserted between the tooth portions of the gear piece are separately provided, so that the spline chamfer contact area can be ensured and the contact pressure in synchronization action can be lowered, even if the spline tooth thickness is made smaller.

Preferably, the first tooth portion includes a first long inclined surface that comes in surface contact with a tooth portion of the synchronizer ring when the synchronizer ring rotates in a first direction with respect to the hub sleeve, and a first short inclined surface having a length along a circumferential direction shorter than the first long inclined surface.

Preferably, the second tooth portion includes a second long inclined surface that comes in surface contact with a tooth portion of the synchronizer ring when the synchronizer ring rotates in a second direction with respect to the hub sleeve, and a second short inclined surface having a length along a circumferential direction shorter than the second long inclined surface.

Preferably, the third tooth portion has a tip end that has an angle smaller than that of a tip end of each of the first and second tooth portions and is located closer to the gear piece than the tip end of each of the first and second tooth portions.

Preferably, the first and second tooth portions are arranged adjacent to each other.

A sleeve spline structure of a synchronizer according to the present invention is provided in a hub sleeve of the synchronizer in which a synchronizer ring is interposed between the hub sleeve and a gear piece. The sleeve spline structure includes first to third tooth portions. The first tooth portion includes a first long inclined surface that comes in surface contact with a tooth portion of the synchronizer ring when the synchronizer ring rotates in a first direction with respect to the hub sleeve, and a first short inclined surface having a length along a circumferential direction shorter than the first long inclined surface. The second tooth portion includes a second long inclined surface that comes in surface contact with a tooth portion of the synchronizer ring when the synchronizer ring rotates in a second direction with respect to the hub sleeve, and a second short inclined surface having a length along a circumferential direction shorter than the second long inclined surface. The third tooth portion has a tip end that has an angle smaller than that of a tip end of each of the first and second tooth portions and is located closer to the gear piece than the tip end of each of the first and second tooth portions.

According to the present invention, a sleeve spline structure of a synchronizer capable of lowering contact pressure in synchronization action can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a plan view of the synchronizer after push-through.

DESCRIPTION OF THE PREFERRED EMBODIMENTS

Figure 1:
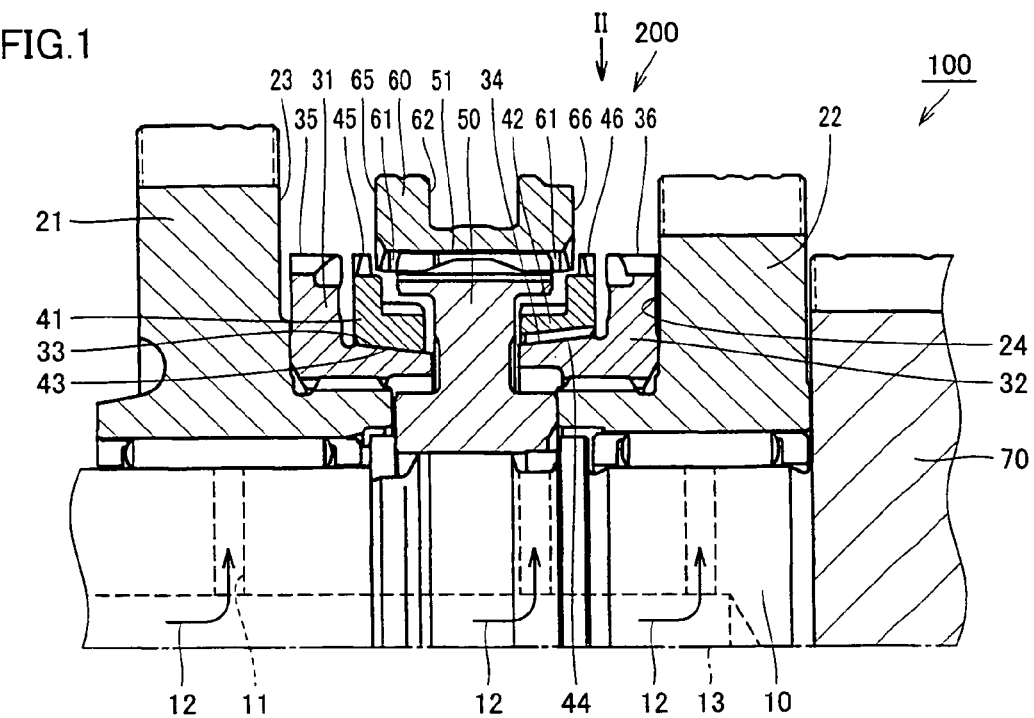
FIG. 1 is a cross-sectional view of a manual transmission having a synchronizer according to the present invention.

An embodiment of the present invention will be described hereinafter with reference to the drawings. The same or corresponding elements have the same reference characters allotted, and therefore, detailed description thereof will not be repeated.

Referring to FIG. 1, a manual transmission 100 serves as a powertrain converting engine speed and rotation torque in accordance with a running state of a vehicle and transmitting the same to drive wheels. Manual transmission 100 may be implemented as what is called a remote-control-type manual transmission 100 in which a shift lever operated by a driver of the vehicle is provided at a distance from manual transmission 100 and they are connected to each other through a cable, a link and the like, and as what is called a direct-control-type manual transmission in which a shift lever is directly attached to manual transmission 100.

As to the remote-control-type manual transmission, location of a shift lever is not particularly limited, and a column-shift-type manual transmission in which the shift lever is attached to a steering column portion, a floor-shift-type manual transmission in which the shift lever is attached to the floor, and the like may be adopted.

FIG. 1 shows a constant-mesh manual transmission. The present invention is also applicable to a semiautomatic transmission and a full automatic transmission in which an actuator or the like is used to move a select lever for transmission.

Manual transmission 100 has a rotation shaft 10. Rotation shaft 10 can rotate around a rotation axis 13, and rotation force from the engine is transmitted to rotation shaft 10.

A lubricant passage 11 for supplying a lubricant is provided in rotation shaft 10. Lubricant passage 11 extends in one direction along rotation axis 13, and its branch extends toward an outer circumferential side. The lubricant (oil) is supplied in a direction shown with an arrow 12 through lubricant passage 11.

A gear 70 is connected to rotation shaft 10, and gear 70 and rotation shaft 10 rotate together. A clutch hub 50 is attached to rotation shaft 10. Clutch hub 50 is spline-coupled to rotation shaft 10 such that it rotates together with rotation shaft 10. Here, a method of fixing clutch hub 50 to rotation shaft 10 is not limited to spline-coupling, and other normal methods may be employed.

In FIG. 1, each structural member is arranged symmetrically around rotation axis 13. Gears 21, 22 serving as driven gears are fitted to rotation shaft 10, and gears 21, 22 can rotate relative to rotation shaft 10. That is, in a state shown in FIG. 1, rotation force of rotation shaft 10 is not transmitted to gears 21, 22, and gears 21, 22 turn free. An inner circumferential side of gears 21, 22 faces rotation shaft 10, and slides with respect to rotation shaft 10. In order to lower friction during sliding, a lubricant is supplied to a friction surface between rotation shaft 10 and gear 21, as shown with arrow 12.

Gear pieces 31, 32 are spline-coupled to gears 21, 22. Gear pieces 31, 32 are members constituting a synchronizer 200, and rotate together with gears 21, 22. In the state shown in FIG. 1, gear pieces 31, 32 are not fixed to clutch hub 50. Therefore, gear pieces 31, 32 can rotate freely with respect to clutch hub 50.

Gear pieces 31, 32 have cone portions 33, 34 implemented as tapered surfaces inclined with respect to rotation axis 13, respectively. Synchronizer rings 41, 42 are fitted onto cone portions 33, 34 respectively. Synchronizer rings 41, 42 are devices for synchronizing rotation of gear pieces 31, 32 with rotation of clutch hub 50, and have cone portions 43, 44 implemented as tapered surfaces, respectively. Cone portions 43, 44 of synchronizer rings 41, 42 come in contact with, and carry out friction sliding with respect to, cone portions 33, 34 of gear pieces 31, 32 respectively.

A hub sleeve 60 is fitted to outer teeth 51 of clutch hub 50. Hub sleeve 60 can slide in a direction in which rotation axis 13 extends. Inner teeth 61 of hub sleeve 60 are engaged with outer teeth 51 of clutch hub 50, so that clutch hub 50 slidably holds hub sleeve 60. Hub sleeve 60 can slide toward gear 21 side and also toward gear 22 side.

As gear pieces 31, 32 come in contact with synchronizer rings 41, 42 via cone portions 33, 34, 43, 44, rotation of gear pieces 31, 32 is transmitted to synchronizer rings 41, 42. Hub sleeve 60 is provided with a groove 62 fitted to a shift fork, and groove 62 is located between end surfaces 65, 66 of hub sleeve 60.

Figure 2:
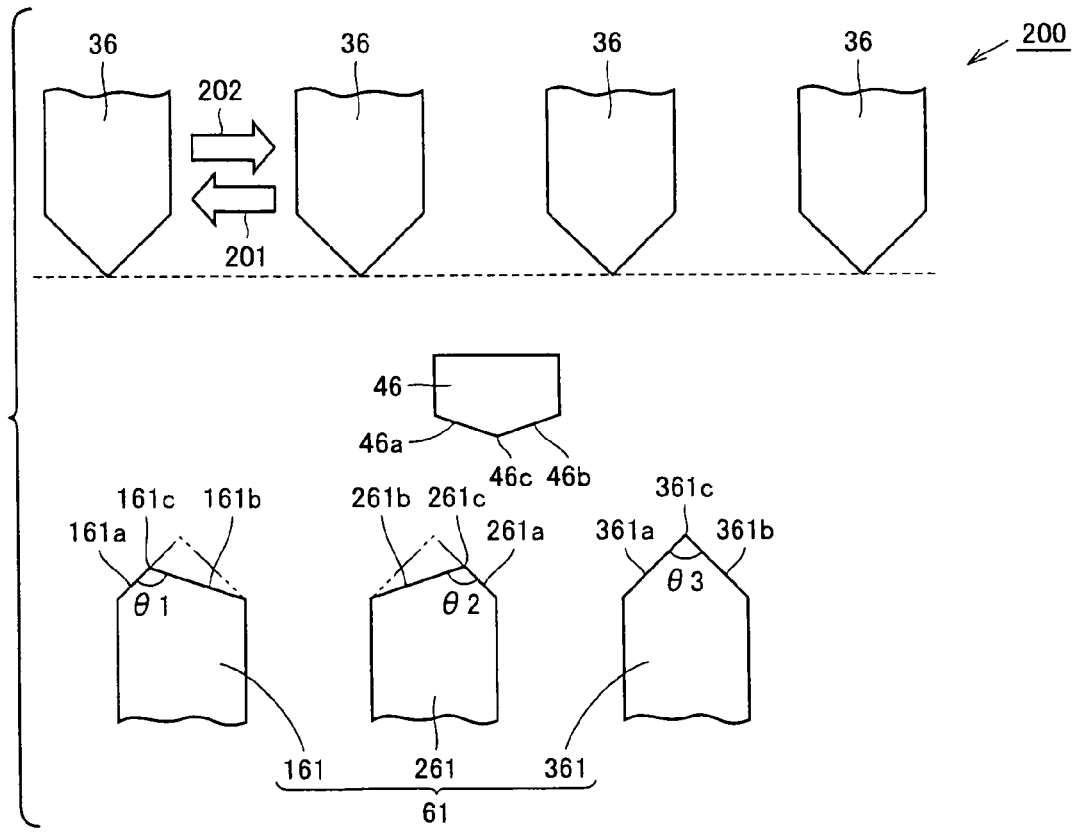
FIG. 2 is a plan view of the synchronizer viewed from the direction shown with an arrow II in FIG. 1.

Referring to FIG. 2, a synchronizer 200 includes an outer tooth 36 used in the gear piece, inner tooth 61 provided in hub sleeve 60, and an outer tooth 46 of the synchronizer ring. Outer teeth 36 of the gear piece are aligned at prescribed intervals. Outer tooth 36 has a tapered tip end, such that the outer tooth is fitted with the inner tooth of the sleeve.

Outer tooth 46 of the synchronizer ring is provided between outer tooth 36 of the gear piece and inner tooth 61 of the hub sleeve, at a prescribed distance from outer tooth 36 of the gear piece. Outer tooth 46 has a tip end portion 46c and a first inclined surface 46a and a second inclined surface 46b. A ridge portion where first inclined surface 46a intersects with second inclined surface 46b serves as tip end portion 46c. First inclined surface 46a and second inclined surface 46b are substantially equal in an inclination angle with respect to an axial direction (direction in which outer tooth 36 and inner tooth 61 extend). Though not shown in FIG. 2, outer teeth 46 are provided and arranged at a distance from each other.

Inner tooth 61 of the hub sleeve has a first tooth portion 161, a second tooth portion 261, and a third tooth portion 361. First tooth portion 161 is an inner tooth used in transmission synchronization in acceleration (shifting up). First tooth portion 161 has a first long inclined surface 161b, a first short inclined surface 161a, and a tip end portion 161c which is the ridge portion where first long inclined surface 161b intersects with first short inclined surface 161a. Tip end portion 161c has an angle θ1. First tooth portion 161 is implemented by removing a part of the outer tooth having a size shown with a chain-double-dotted line.

Second tooth portion 261 has a second long inclined surface 261b, a second short inclined surface 261a, and a tip end portion 261c which is the ridge portion where second long inclined surface 261b intersects with second short inclined surface 261a. The tip end portion of second tooth portion 261 has a shape symmetrical with respect to the tip end portion of first tooth portion 161. Second short inclined surface 261a has substantially the same inclination as that of first short inclined surface 161a, and second long inclined surface 261b has substantially the same inclination as that of first long inclined surface 161b.

In addition, first short inclined surface 161a has a length substantially the same as that of second short inclined surface 261a, and first long inclined surface 161b also has a length substantially the same as that of second long inclined surface 261b.

Tip end portion 261c has an angle θ2, which is substantially equal to angle θ1 of tip end portion 161c of first tooth portion 161. Second tooth portion 261 is used in transmission synchronization in deceleration (shifting down).

Third tooth portion 361 is provided adjacent to second tooth portion 261. Third tooth portion 361 has two inclined surfaces 361a, 361b having substantially equal inclination and a tip end portion 361c which is the ridge portion where two inclined surfaces 361a and 361b intersect with each other. Tip end portion 361c has an angle θ3, which is smaller than angles θ1 and θ2 described above. Tip end portion 361c is located closer to the gear piece side than tip end portions 161c, 261c of first and second tooth portions 161, 261. That is, third tooth portion 361 is structured to have a larger length than first and second tooth portions 161, 261.

Namely, the sleeve spline structure of synchronizer 200 according to the present invention includes first tooth portion 161 for synchronization in shifting up (acceleration), second tooth portion 261 for synchronization in shifting down (deceleration), and third tooth portion 361 in a shape readily inserted between the tooth portions of the gear piece.

The sleeve spline structure here is used for shifting to gear 22. Shifting to gear 22 includes shifting-up representing shifting from a lower gear and shifting-down representing shifting from a higher gear.

First tooth portion 161 includes first long inclined surface 161b that comes in surface contact with outer tooth 46 of synchronizer ring 42 when synchronizer ring 42 rotates in the first direction shown with an arrow 201 with respect to hub sleeve 60, and first short inclined surface 161a having a length along a circumferential direction shorter than first long inclined surface 161b. Second tooth portion 261 includes second long inclined surface 261b that comes in surface contact with outer tooth 46 of synchronizer ring 42 when synchronizer ring 42 rotates in the second direction shown with an arrow 202 with respect to hub sleeve 60, and second short inclined surface 261a having a length along a circumferential direction shorter than second long inclined surface 261b. Third tooth portion 361 has tip end portion 361c that has angle θ3 smaller than that of the tip end of each of first and second tooth portions 161, 261 and is located closer to the gear piece than the tip end of each of first and second tooth portions 161, 261. First and second tooth portions 161, 261 are arranged adjacent to each other.

An operation in synchronization will now be described.

Before synchronization, as shown in FIGS. 1 and 2, hub sleeve 60 is at a neutral position, and gear 22 and gear piece 32 turn free with respect to hub sleeve 60.

Figure 3:
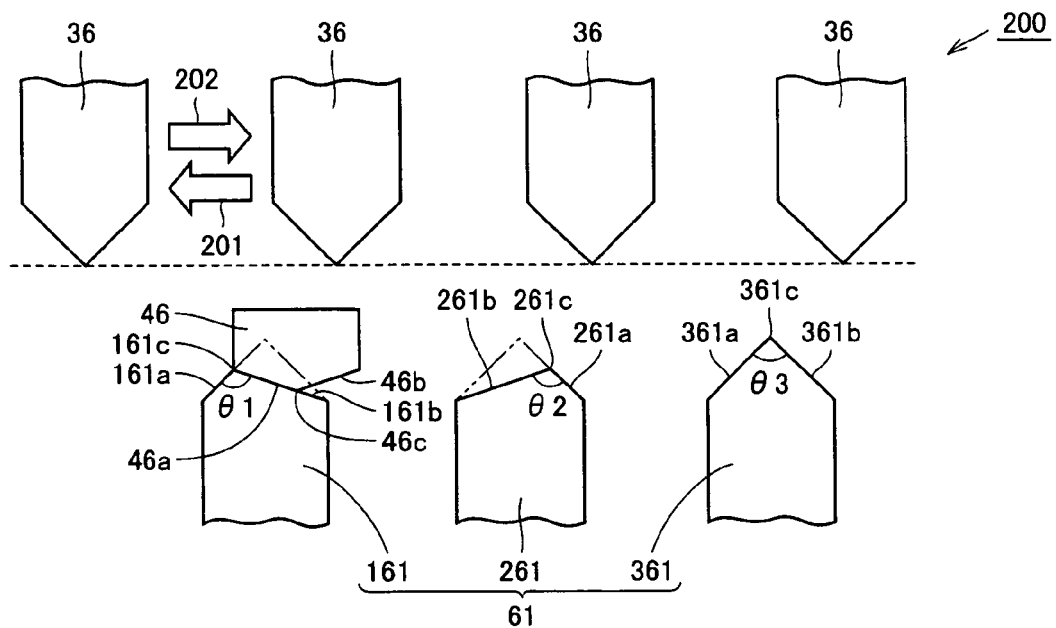
FIG. 3 is a plan view of the synchronizer in shifting up (acceleration synchronization).

When rotation of hub sleeve 60 is synchronized with rotation of gear 22, hub sleeve 60 is moved toward gear 22, starting from the state shown in FIG. 1. Outer teeth 46 of synchronizer ring 42 thus come in contact with inner teeth 61 of hub sleeve 60. Specifically, in shifting up (acceleration synchronization), as shown in FIG. 3, first long inclined surface 161b of first tooth portion 161 of inner tooth 61 comes in surface contact with first inclined surface 46a of outer tooth 46 of synchronizer ring 42. As the inclination angle of the first long inclined surface 161b is substantially equal to that of first inclined surface 46a and first long inclined surface 161b is longer than other inclined surfaces, first long inclined surface 161b comes in intimate contact with first inclined surface 46a across a wide area. In addition, in acceleration, outer tooth 36 of the gear piece and outer tooth 46 of the synchronizer ring move in a direction shown with arrow 201. Therefore, first tooth portion 161 receives force from outer teeth 46 of the synchronizer ring, and rotation of synchronizer ring 42 is synchronized with rotation of inner tooth 61 of hub sleeve 60.

Figure 4:
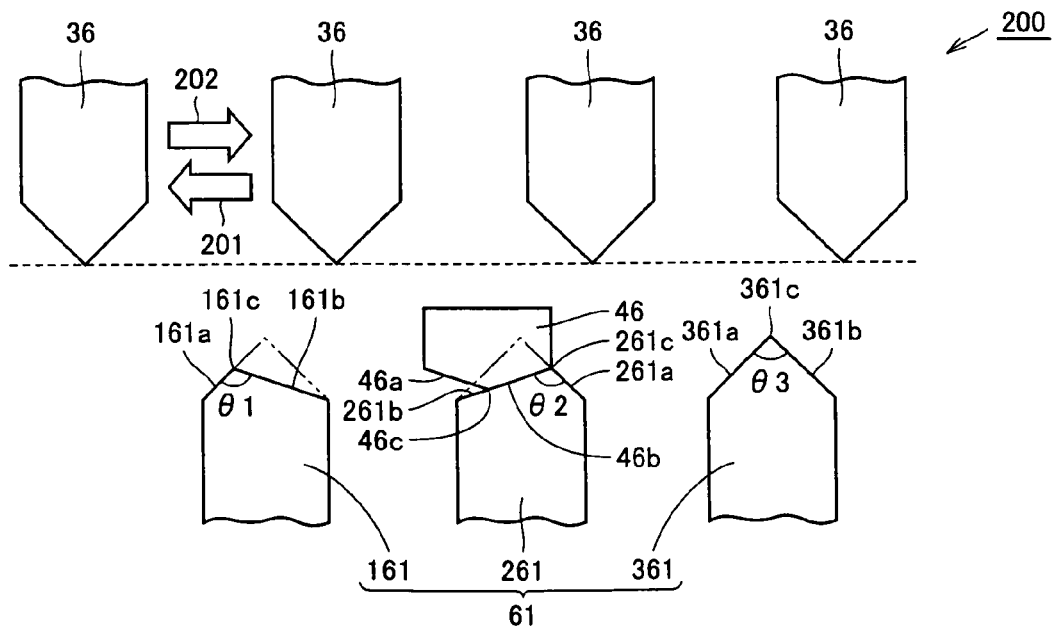
FIG. 4 is a plan view of the synchronizer in shifting down (deceleration synchronization).

As shown in FIG. 4, in shifting down (deceleration synchronization), outer teeth 36 of the gear piece and outer teeth 46 of the synchronizer ring move in a direction shown with arrow 202 with respect to inner teeth 61 of hub sleeve 60. First long inclined surface 261b of second tooth portion 261 thus adheres to second inclined surface 46b provided in outer tooth 46 of synchronizer ring 42. Inclination of second inclined surface 46b is substantially the same as that of second long inclined surface 261b. Moreover, as second long inclined surface 261b is longer than other inclined surfaces, second long inclined surface 261b comes in intimate contact with second inclined surface 46b across a wide area. Therefore, rotation of inner teeth 61 of hub sleeve 60 is synchronized with rotation of outer teeth 46 of synchronizer ring 42.

Figure 5:
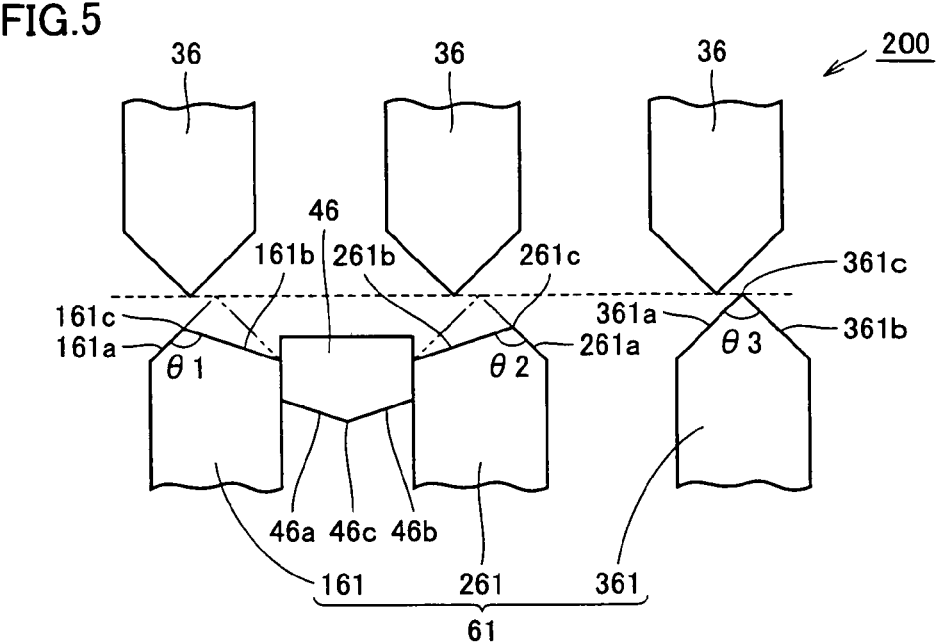

Referring to FIG. 5, when a synchronization operation further proceeds, hub sleeve 60 moves toward gear 22 side. Inner tooth 61 thus moves from the position shown in FIGS. 3 and 4 to outer tooth 36 side. Here, outer tooth 46 of synchronizer ring 42 is inserted between a plurality of tooth portions. When synchronization further proceeds from the state shown in any of FIGS. 3 and 4, outer tooth 46 of synchronizer ring 42 is inserted between first tooth portion 161 and second tooth portion 261 as shown in FIG. 5.

Figure 6:
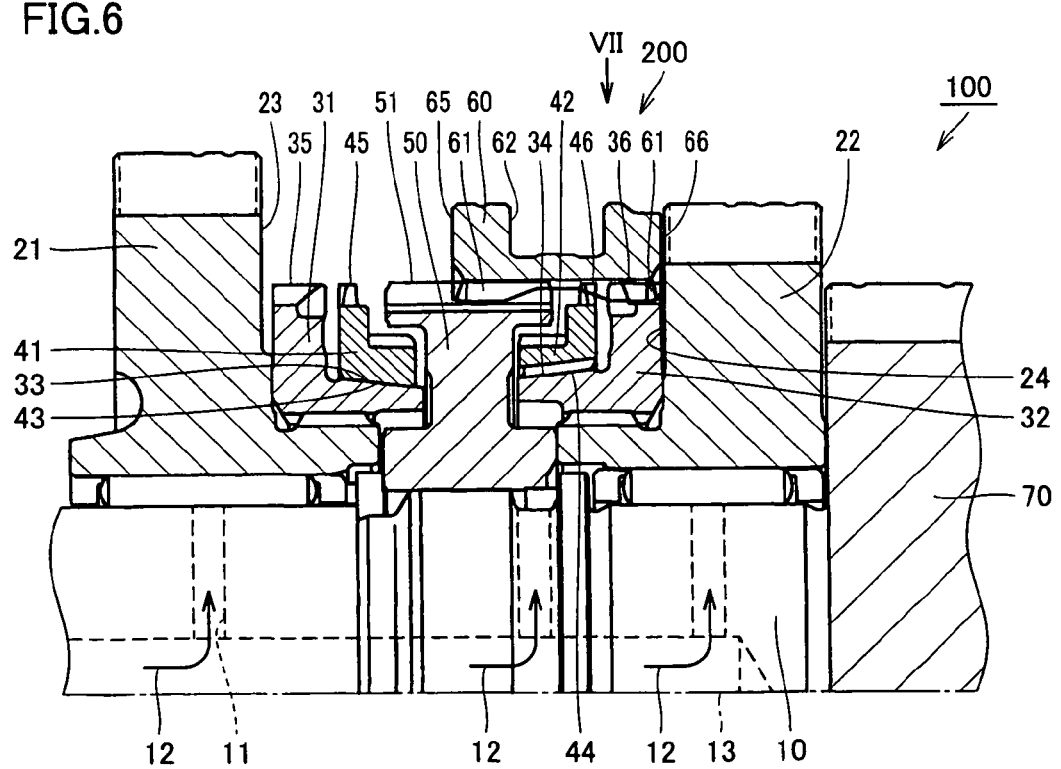
FIG. 6 is a cross-sectional view of the manual transmission after gear shifting is completed.
Figure 7:
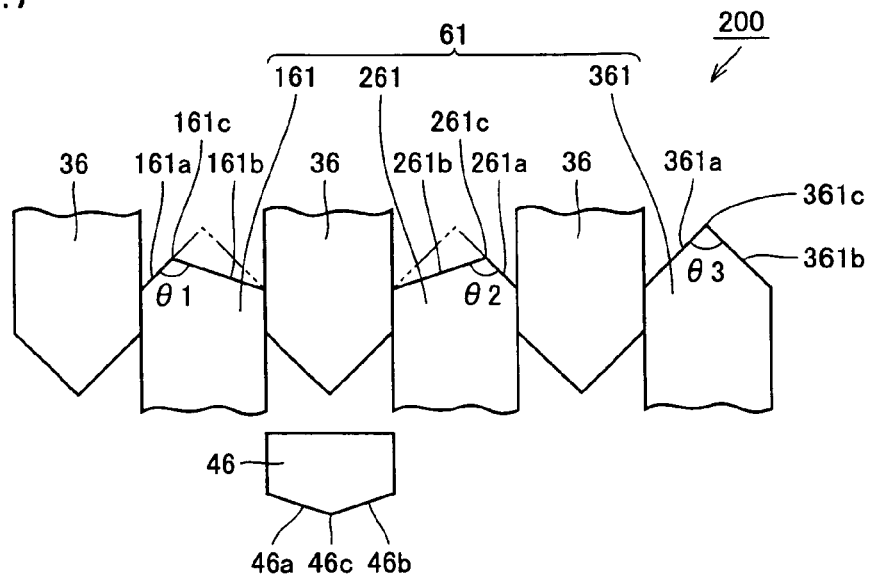
FIG. 7 is a plan view of the synchronizer viewed from the direction shown with an arrow VII in FIG. 6.

Referring to FIGS. 6 and 7, when hub sleeve 60 is further pressed toward gear 22 from the position shown in FIG. 5, inner tooth 61 of hub sleeve 60 is inserted between outer teeth 36 of gear piece 32 as shown in FIGS. 6 and 7. Here, inner teeth 61 of hub sleeve 60 and outer teeth 36 of gear piece 32 rotate together, and power is transmitted from hub sleeve 60 to gear piece 32. A gear shifting operation is thus completed.

Figure 8:
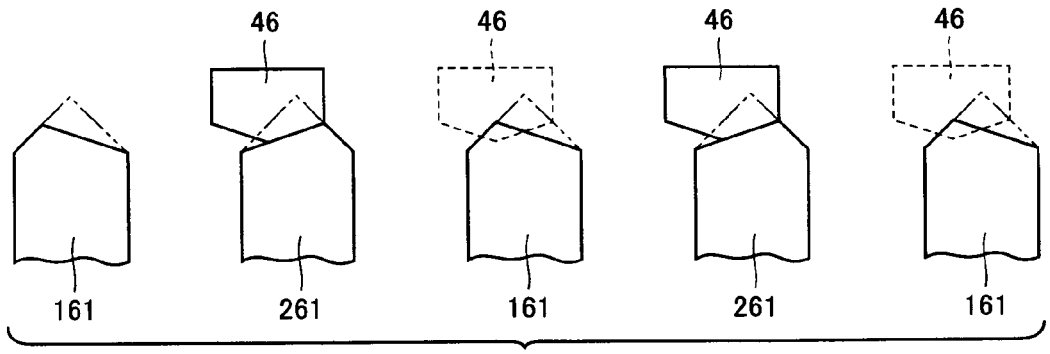
FIG. 8 is a plan view showing arrangement of outer teeth of a synchronizer ring.
Figure 9:
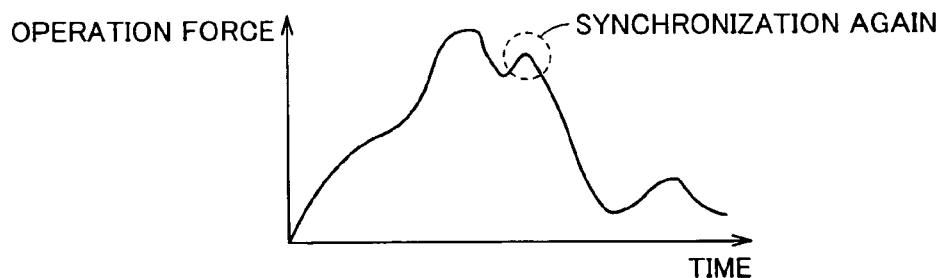
FIG. 9 is a graph showing operation force for illustrating down chamfer contact.

Referring to FIG. 8, the number of outer teeth 46 of synchronizer ring 42 in the synchronizer according to the present invention is smaller than that of other tooth portions, that is, the outer teeth are thinned out. Outer tooth 46 drawn with dotted line in FIG. 8 is not provided.

If outer teeth are present at positions shown with dotted line in FIG. 8, the outer teeth come in contact with the first and second short inclined surfaces, which is not preferable.

According to the synchronizer of the present invention structured as above, the tooth for synchronization in shifting up (acceleration) and the tooth for synchronization in shifting down (deceleration) are provided. Therefore, even when a module (thickness of the tooth) is made smaller, chamfer contact area per one tooth in synchronization is readily ensured and the contact pressure can be lowered. Specifically, the tooth for synchronization and the tooth for push-through into gear piece are separately provided, so that the spline chamfer angle of inner tooth 61 of hub sleeve 60 is made narrower, for the purpose of lowering contact pressure in synchronization action and lowering two-stage synchronization force. Here, in order to ensure a length of engagement between gear piece 32 and inner tooth 61 after gear shifting, that is, in order to shorten the total length of the transmission and a shift stroke, the module (spline tooth thickness) is concurrently made smaller in many cases. In such a case, the spline chamfer contact area is also made smaller and the contact pressure in the synchronization action tends to be high. According to the present invention, however, as inner tooth 61 and outer tooth 46 come in contact with each other across a wide inclined surface, the contact pressure can be lowered.

In addition, angle θ3 at the tip end of third tooth portion 361 serving as the tooth dedicated for push-through is made smaller, so as to lower two-stage synchronization force.

As shown in FIG. 7, after gear shifting is completed, all splines can transmit the torque.

In addition, according to the present invention, down chamfer contact can be eliminated. Here, down chamfer contact will be described. Referring to FIGS. 3 and 4, when synchronization is started, first or second tooth portion 161, 261 of hub sleeve 60 comes in contact with outer tooth 46 of synchronizer ring 42, and hub sleeve 60 attempts to rotate relative to synchronizer ring 42. Accordingly, first and second tooth portions 161, 261 receive force from outer tooth 46, and stable contact is ensured when synchronization is started. When synchronization is completed in the state shown in FIG. 3 or 4, however, outer teeth 46 of synchronizer ring 42 rotate together with inner teeth 61 of the hub sleeve, and the pressing force as described above disappears. Then, hub sleeve 60 rotates relative to synchronizer ring 42. Specifically, rotation and movement in the axial direction take place. Then, synchronization occurs again in an adjacent tooth, and feeling as if caught is felt as the gear-shifting operation characteristic.

Even if operation force once attains to the maximum and synchronization occurs, synchronization as shown in the drawing occurs again when down chamfer contact takes place. Consequently, uncomfortable feeling in the operation is caused.

According to the present invention, however, first and second long inclined surfaces 161b, 261b come in contact with first and second inclined surfaces 46a, 46b of outer tooth 46 of synchronizer ring 42 across a wide area. Consequently, even when pressing force is no longer present, first and second long inclined surfaces 161b, 261b come in contact with first and second inclined surfaces 46a, 46b of outer tooth 46 in a stable manner, and occurrence of down chamfer contact can be prevented.

Figure 10:
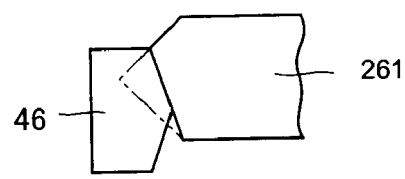
FIG. 10 is a plan view showing a structure of first to third tooth portions in the synchronizer.
Figure 10:
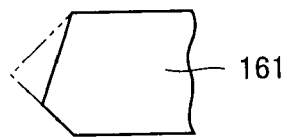
Figure 10:
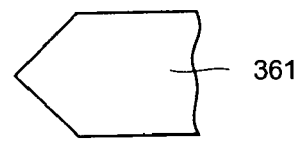
Figure 10:
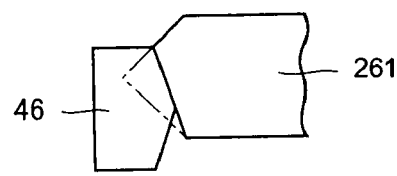
Figure 10:
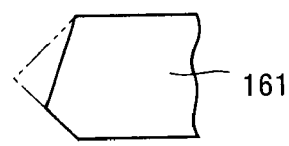
Figure 10:
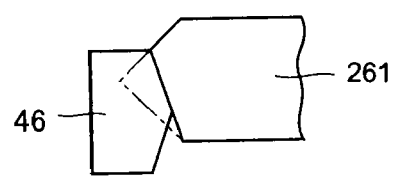
Figure 10:
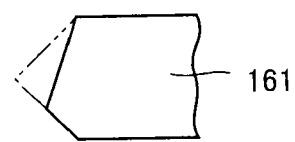

Referring to FIG. 10, first tooth portion 161, second tooth portion 261, and third tooth portion 361 are aligned in sequence. Though the tooth portions are arranged in the order of the first tooth portion, the second tooth portion, the first tooth portion, the second tooth portion, and the third tooth portion in FIG. 10, the present invention is not limited as such. Basically, the first and second tooth portions 161, 261 are alternately arranged, and third tooth portions 361 are periodically distributed. Meanwhile, outer tooth 46 is provided at every other location. Here, if the outer tooth is provided simply at every other location, however, the outer tooth comes in contact with third tooth portion 361. Therefore, outer tooth 46 is not provided, depending on presence of third tooth portion 361.

In the embodiment described above, the structure is provided with third tooth portion 361. If first and second tooth portions 161, 261 having a shape suitable for push-through are provided, it is not necessary to provide third tooth portion 361.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sleeve spline structure of a synchronizer, provided in a hub sleeve of the synchronizer in which a synchronizer ring is interposed between the hub sleeve and a gear piece, comprising:
    a first tooth portion for synchronization in shifting up, said first tooth portion includes a first long inclined surface that comes in surface contact with a first facet of a tooth portion of said synchronizer ring when said synchronizer ring rotates in a first direction with respect to said hub sleeve, and a first short inclined surface having a length along a circumferential direction shorter than said first long inclined surface;
    a second tooth portion for synchronization in shifting down, said second tooth portion includes a second long inclined surface that comes in surface contact with a second facet of the tooth portion of said synchronizer ring when said synchronizer ring rotates in a second direction with respect to said hub sleeve, and a second short inclined surface having a length along a circumferential direction shorter than said second long inclined surface; and
    a third tooth portion in a shape readily inserted between tooth portions of the gear piece, said third tooth portion has a tip end that has an angle smaller than that of a tip end of each of said first and second tooth portions and is located closer to the gear piece than the tip end of each of said first and second tooth portions.

2. The sleeve spline structure of a synchronizer according to claim 1, wherein said first and second tooth portions are arranged adjacent to each other.

3. The sleeve spline structure of a synchronizer according to claim 1,
    wherein said first and second tooth portions are arranged adjacent to each other,
    wherein said first short inclined surface of first tooth portion is located a first distance from said second short inclined surface of the second tooth portion, and said first long inclined surface of first tooth portion is located a second distance to said second long inclined surface of the second tooth portion, and wherein the first distance is greater than the second distance.

4. The sleeve spline structure of a synchronizer according to claim 1, wherein said first long inclined surface of said first tooth portion extends from a first extended surface of the first tooth portion that extends substantially parallel to an axis of rotation of the sleeve spline structure, and wherein said first long inclined surface is inclined relative to said first extended surface of the first tooth portion;
    wherein said first short inclined surface of the first tooth portion extends to a second extended surface of the first tooth portion that extends substantially parallel to the axis of rotation of the sleeve spline structure, and wherein said first short inclined surface is inclined relative to said second extended surface of the first tooth portion; and
    wherein said first extended surface of the first tooth portion is substantially parallel to the second extended surface of the first tooth portion.

5. The sleeve spline structure of a synchronizer according to claim 1, wherein said second long inclined surface of said second tooth portion extends from a first extended surface of the second tooth portion that extends substantially parallel to an axis of rotation of the sleeve spline structure, and wherein second long inclined surface is inclined relative to said first extended surface of the second tooth portion;
    wherein said second short inclined surface of the second tooth portion extends to a second extended surface of the second tooth portion that extends substantially parallel to the axis of rotation of the sleeve spline structure, and wherein second short inclined surface is inclined relative to the second extended surface of the second tooth portion; and
    wherein said first extended surface of the second tooth portion is substantially parallel to the second extended surface of the second tooth portion.

6. The sleeve spline structure of a synchronizer according to claim 1, wherein the first tooth portion has a first tooth portion tip end angle which is an included angle through an apex formed by said first short inclined surface and said first long inclined surface;
    wherein the second tooth portion has a second tooth portion tip end angle which is an included angle through an apex formed by inclined surfaces of the second tooth portion;
    wherein said angle of the tip end of the third tooth portion is an included angle through an apex created by inclined surfaces of the third tooth portion; and
    wherein said angle of the tip end of the third tooth portion is smaller than said first tooth portion tip end angle and said angle of the tip end of the third tooth portion is smaller than said second tooth portion tip end angle.

7. A sleeve spline structure of a synchronizer, provided in a hub sleeve of the synchronizer in which a synchronizer ring is interposed between the hub sleeve and a gear piece, comprising first to third tooth portions; wherein
    said first tooth portion includes a first long inclined surface that comes in surface contact with a tooth portion of said synchronizer ring when said synchronizer ring rotates in a first direction with respect to said hub sleeve, and a first short inclined surface having a length along a circumferential direction shorter than said first long inclined surface, said second tooth portion includes a second long inclined surface that comes in surface contact with the tooth portion of said synchronizer ring when said synchronizer ring rotates in a second direction with respect to said hub sleeve, and a second short inclined surface having a length along a circumferential direction shorter than said second long inclined surface, and said third tooth portion has a tip end that has an angle smaller than that of a tip end of each of said first and second tooth portions and is located closer to the gear piece than the tip end of each of said first and second tooth portions.

8. The sleeve spline structure of a synchronizer according to claim 7, wherein said first and second tooth portions are arranged adjacent to each other, wherein said first short inclined surface of first tooth portion is located a first distance from said second short inclined surface of the second tooth portion, and said first long inclined surface of first tooth portion is located a second distance to said second long inclined surface of the second tooth portion, and wherein the first distance is greater than the second distance.

9. The sleeve spline structure of a synchronizer according to claim 8, wherein the sleeve spline structure includes a plurality of said adjacently arranged first and second tooth portions.

10. The sleeve spline structure of a synchronizer according to claim 9, wherein the sleeve spline structure includes a plurality of said third tooth portions arranged between groupings of adjacent first and second tooth portions.

11. The sleeve spline structure of a synchronizer according to claim 7, wherein the first tooth portion has a first tooth portion tip end angle which is an included angle through an apex formed by said first short inclined surface and said first long inclined surface;

wherein the second tooth portion has a second tooth portion tip end angle which is an included angle through an apex formed by said second short inclined surface and second long inclined surface;

wherein said angle of the tip end of the third tooth portion is an included angle through an apex created by inclined surfaces of the third tooth portion; and wherein said angle of the tip end of the third tooth portion is smaller than said first tooth portion tip end angle and said angle of the tip end of the third tooth portion is smaller than said second tooth portion tip end angle.

* * * * *